US008165404B2

(12) United States Patent
Matulic

(10) Patent No.: US 8,165,404 B2
(45) Date of Patent: Apr. 24, 2012

(54) METHOD AND APPARATUS FOR CREATING DOCUMENT DATA, AND COMPUTER PROGRAM PRODUCT

(75) Inventor: Fabrice Matulic, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 861 days.

(21) Appl. No.: 12/211,240

(22) Filed: Sep. 16, 2008

(65) Prior Publication Data

US 2009/0074298 A1 Mar. 19, 2009

(30) Foreign Application Priority Data

Sep. 19, 2007 (JP) ................................ 2007-242398
Aug. 21, 2008 (JP) ................................ 2008-213114

(51) Int. Cl.
*G06K 9/18* (2006.01)
*G06K 9/46* (2006.01)
*G06K 9/62* (2006.01)
*G06K 9/36* (2006.01)
*G06K 9/32* (2006.01)

(52) U.S. Cl. ........ 382/203; 382/186; 382/209; 382/291; 382/294; 382/295

(58) Field of Classification Search ........................ None
See application file for complete search history.

(56) References Cited

U.S. PATENT DOCUMENTS

| 5,652,806 | A | * | 7/1997 | Friend ........................... 382/175 |
| 5,832,474 | A | * | 11/1998 | Lopresti et al. ..................... 1/1 |
| 7,518,597 | B2 | * | 4/2009 | Itoh et al. ....................... 345/173 |
| 7,743,322 | B2 | * | 6/2010 | Atkins ........................... 715/243 |
| 7,924,452 | B2 | * | 4/2011 | Matsuda ....................... 358/1.15 |
| 2009/0002392 | A1 | * | 1/2009 | Hou et al. ....................... 345/619 |
| 2009/0089660 | A1 | * | 4/2009 | Atkins et al. ..................... 715/243 |

FOREIGN PATENT DOCUMENTS

| JP | 2006-93862 | 4/2006 |
| JP | 2007-150858 | 6/2007 |

OTHER PUBLICATIONS

Cullen et al., "Document image database retrieval and browsing using texture analysis", Document Analysis and Recognition, 1997., Proceedings of the Fourth International Conference on, 1997, pp. 718-721.*
Hashimoto et al., "Retrieving web page layouts using sketches to support example-based web design", EUROGRAPHICS Workshop on Sketch-Based Interface and Modeling, 2005, pp. 1-10.*
Peng et al., "Document Image Recognition Based on Template Matching of Component Block Projections", IEEE Transactions on Pattern Analysis and Machine Intelligence, Sep. 2003 (vol. 25 No. 9) pp. 1188-1192.*

(Continued)

*Primary Examiner* — Tom Y Lu
*Assistant Examiner* — Thomas Conway
(74) *Attorney, Agent, or Firm* — Oblon, Spivak, McClelland, Maier & Neustadt, L.L.P.

(57) ABSTRACT

In an apparatus for creating document data, an acquiring unit acquires a handwritten figure; and a recognizing unit converts the handwritten figure acquired by the acquiring unit into a specific figure and recognizes a layout including the specific figure as a component as a user-specified layout. A storage unit stores therein data to be inserted into a desired one of a plurality of layout models. A selecting unit selects a layout model similar to the user-specified layout model from among the layout models as a similar layout model; and an inserting unit inserts the data stored in the storage unit into the similar layout model selected by the selecting unit.

19 Claims, 16 Drawing Sheets

OTHER PUBLICATIONS

Smeulders et al., "Content-based image retrieval at the end of the early years", Pattern Analysis and Machine Intelligence, IEEE Transactions on, vol. 22, Issue 12, pp. 1349-1380.*

Yasunari Hashimoto, et al., "Retrieving Web Page Layouts using Sketches to Support Example-based Web Design", EUROGRAPHICS Workshop on Sketch-Based Interfaces and Modeling, 2005, 10 pages.

James A. Landay, et al., "Just Draw It! Programming by Sketching Storyboards", CMU-CS-95-199, Nov. 27, 1995, 18 Pages.

* cited by examiner

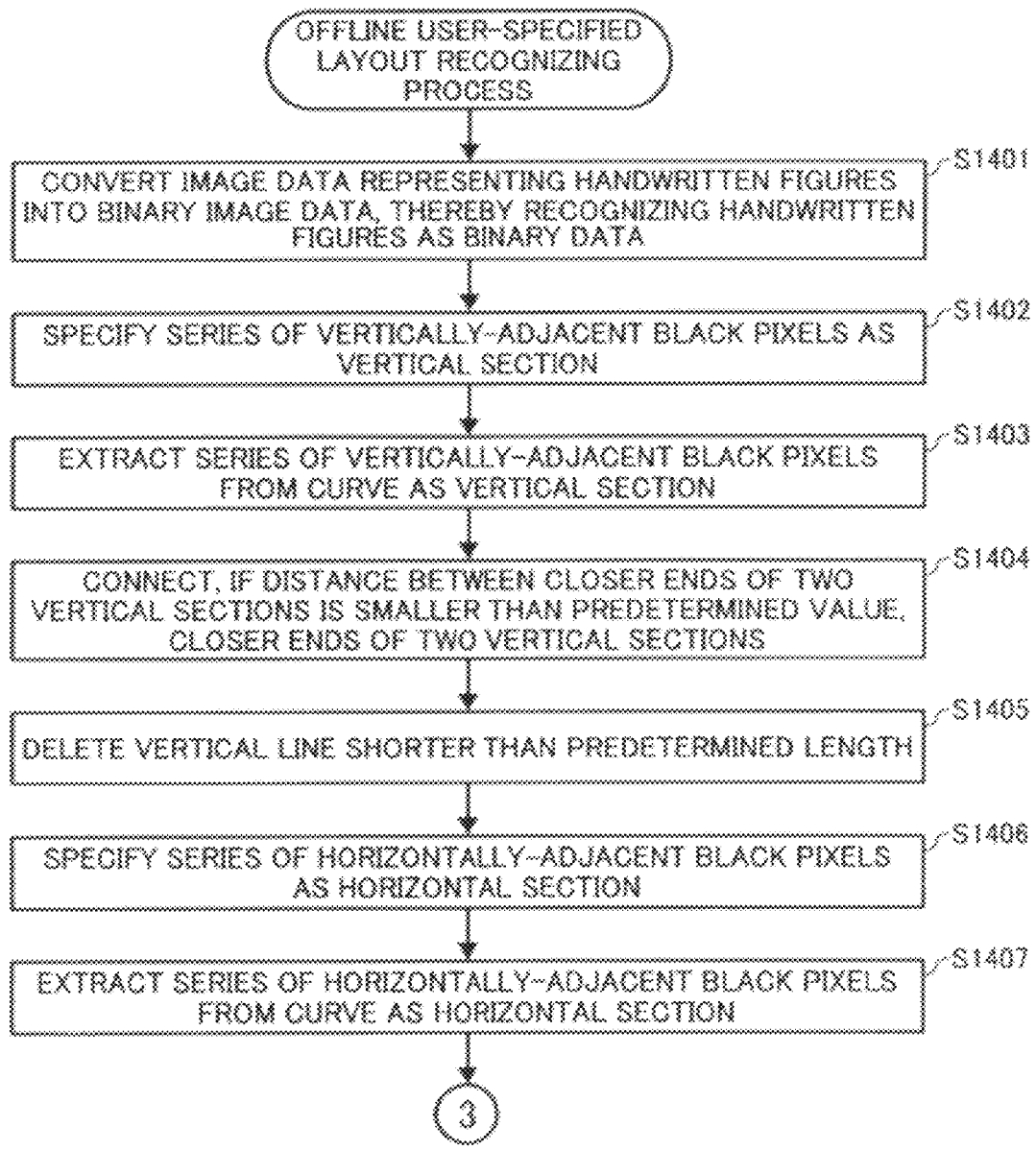

OFFLINE USER-SPECIFIED LAYOUT RECOGNIZING PROCESS

S1401 — CONVERT IMAGE DATA REPRESENTING HANDWRITTEN FIGURES INTO BINARY IMAGE DATA, THEREBY RECOGNIZING HANDWRITTEN FIGURES AS BINARY DATA

S1402 — SPECIFY SERIES OF VERTICALLY-ADJACENT BLACK PIXELS AS VERTICAL SECTION

S1403 — EXTRACT SERIES OF VERTICALLY-ADJACENT BLACK PIXELS FROM CURVE AS VERTICAL SECTION

S1404 — CONNECT, IF DISTANCE BETWEEN CLOSER ENDS OF TWO VERTICAL SECTIONS IS SMALLER THAN PREDETERMINED VALUE, CLOSER ENDS OF TWO VERTICAL SECTIONS

S1405 — DELETE VERTICAL LINE SHORTER THAN PREDETERMINED LENGTH

S1406 — SPECIFY SERIES OF HORIZONTALLY-ADJACENT BLACK PIXELS AS HORIZONTAL SECTION

S1407 — EXTRACT SERIES OF HORIZONTALLY-ADJACENT BLACK PIXELS FROM CURVE AS HORIZONTAL SECTION (3)

METHOD AND APPARATUS FOR CREATING DOCUMENT DATA, AND COMPUTER PROGRAM PRODUCT

CROSS-REFERENCE TO RELATED APPLICATIONS

The present application claims priority to and incorporates by reference the entire contents of Japanese priority documents 2007-242398 filed in Japan on Sep. 19, 2007 and Japanese Priority document 2008-213114 filed in Japan on Aug. 21, 2008.

BACKGROUND OF THE INVENTION

1. Field of the Invention

The present invention relates to a technology for creating document data.

2. Description of the Related Art

There have been known an approach to creating document data formed with image data, text data, and the like with the help of a plurality of layout models that include layout frames (e.g., rectangular frames) indicative of specific positions into which data is to be inserted. A user selects a desired one from the layout models, and inserts a desired piece of data into each of the layout frames of the selected layout model. Thus, the user can easily create presentable document data.

However, if there are many layout models, it can take a considerable time to select desired one from among the layout models, and some users may feel it troublesome to select the desired layout model. To overcome the problem, Japanese Patent Application Laid-open No. 2006-93862 discloses a conventional method of reading an original containing one or more frames, and automatically selecting a layout model including the same number of layout frames as the rectangular frames in the original. However, the conventional method has difficulty in recognizing certain frames, especially, in recognizing handwritten frames, frames with waving lines, or frames with discontinuous lines.

Moreover, the conventional method is not designed to determine, if there is a plurality of layout models including the same number of layout frames, which one is similar to the original layout.

SUMMARY OF THE INVENTION

It is an object of the present invention to at least partially solve the problems in the conventional technology.

According to an aspect of the present invention, there is provided an apparatus for creating document data. The apparatus includes an acquiring unit that acquires a handwritten figure; a recognizing unit that converts the handwritten figure acquired by the acquiring unit into a specific figure, and recognizes a layout including the specific figure as a component as a user-specified layout; a storage unit that stores therein data to be inserted into a desired one of a plurality of layout models; a selecting unit that selects a layout model similar to the user-specified layout model from among the layout models as a similar layout model; and an inserting unit that inserts the data stored in the storage unit into the similar layout model selected by the selecting unit.

According to another aspect of the present invention, there is provided a method of creating document data performed by a document-data creating apparatus that includes a storage unit including therein data to be inserted into a desired one of a plurality of layout models. The method includes acquiring a handwritten figure; recognizing including converting the handwritten figure acquired at the acquiring into a specific figure, and recognizing a layout including the specific figure as a component as a user-specified layout; selecting a layout model similar to the user-specified layout model from among the layout models as a similar layout model; and inserting the data stored in the storage unit into the similar layout model selected at the selecting.

According to still another aspect of the present invention, there is provided a computer program product that includes a computer program stored on a computer-readable recording medium which when executed on a computer realizes the above method of creating document data on a document-data creating apparatus.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
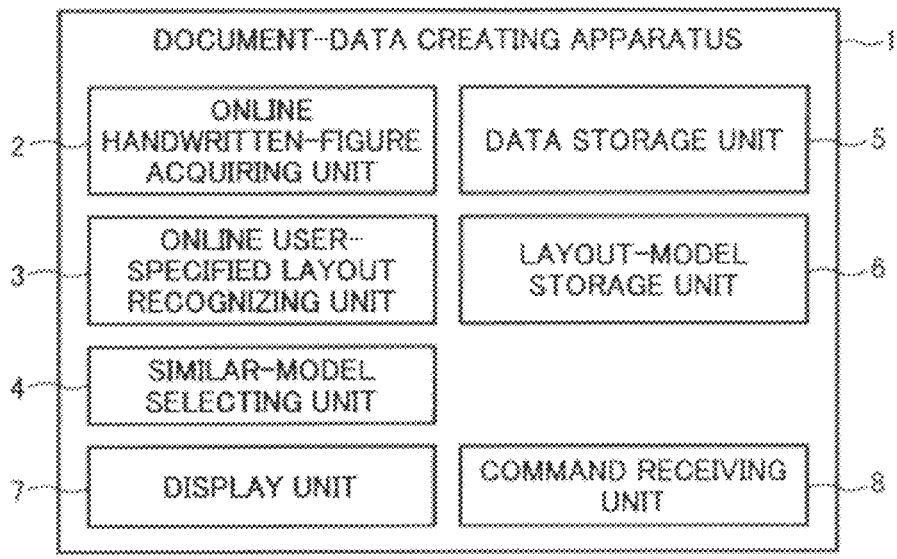
FIG. 1 is a block diagram of a document-data creating apparatus according to a first embodiment of the present invention.

FIG. 1 is a block diagram of a document-data creating apparatus 1 according to a first embodiment of the present invention. The document-data creating apparatus 1 includes an online handwritten-figure acquiring unit 2, an online user-specified layout recognizing unit 3, a similar-model selecting unit 4, a data storage unit 5, a layout-model storage unit 6, a display unit 7, and a command receiving unit 8.

The online handwritten-figure acquiring unit 2 acquires (reads) a plurality of handwritten figures and a desired type of data to be inserted from a user via an online. The online handwritten-figure acquiring unit 2 can be, for example, a pointing device, such as a stylus pen and a mouse, or a touch-sensor screen that responses a touch with a finger or a dedicated pen.

The online user-specified layout recognizing unit 3 recognizes the handwritten figures received from the user, converts those handwritten figures into most-matching simple figures, such as rectangular figures, and recognizes a single layout including the simple figures as a user-specified layout. The user-specified layout can be obtained from even one handwritten figure. An online recognizing process of recognizing the user-specified layout from the handwritten figures will be described in detail later.

The similar-model selecting unit 4 selects layout models similar to the user-specified layout in a descending order of a similarity-level from among a plurality of layout models. A similar-model selecting process of selecting the similar layout models will be described in detail later.

The data storage unit 5 stores therein data to be inserted into data areas (frames in the shape of, for example, rectangle) of the layout model, the created document data, a score list, and a sum of distances. The score list and the sum of distances will be described in detail later. The data to be inserted in the data areas is pieces of data, such as image data or text data, which form the document data. The user selects one of the pieces of data, and inserts the selected piece into the frame (place holder) of the layout model.

The layout-model storage unit 6 stores therein the layout models from which the similar layout models are selected in the similar-model selecting process. Although the layout-model storage unit 6 is shown as a component of the document-data creating apparatus 1, it can be an external device connected externally to the document-data creating apparatus 1.

The display unit 7 displays thereon the handwritten figures, the simple figures, the user-specified layout including the simple figures, various data stored in the data storage unit 5, the layout models stored in the layout-model storage unit 6, and the created document data, and so on.

The command receiving unit 8 receives various commands from the user. The command receiving unit 8 can be, although not limited to, a keyboard, a pointing device such as a stylus pen or a mouse, or a touch-sensor screen that responses a touch with a finger or a dedicated pen.

Figure 2:
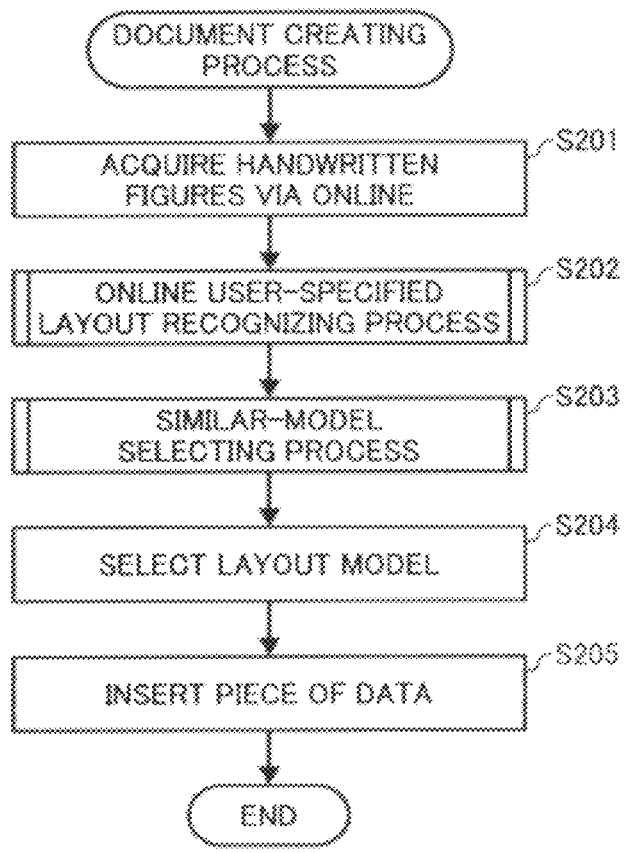
FIG. 2 is a flowchart of a document creating process according to the first embodiment.

A document creating process of creating the document data performed by the document-data creating apparatus 1 is described below. FIG. 2 is a flowchart of the document creating process according to the first embodiment.

Figure 3:
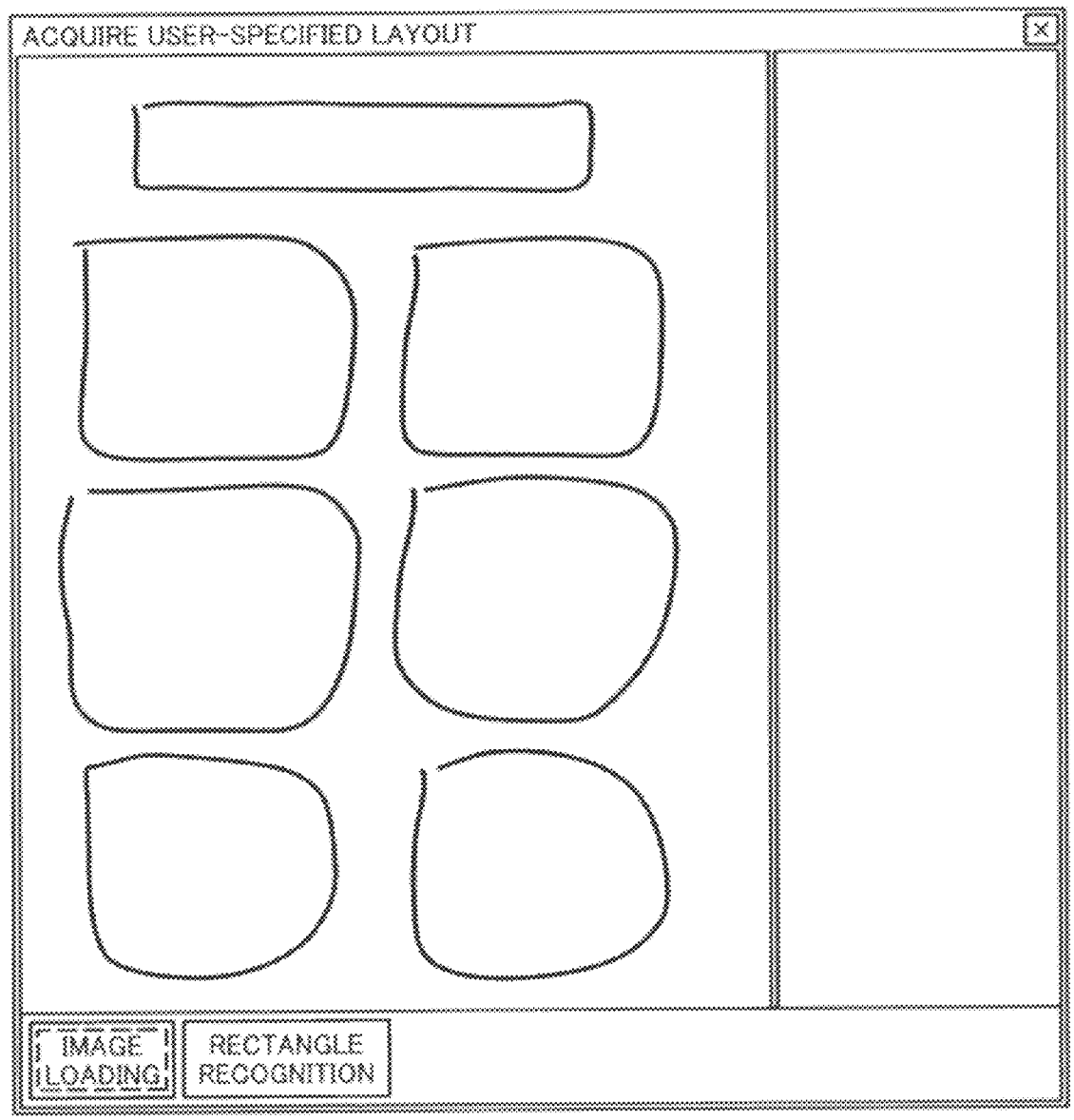
FIG. 3 is a schematic diagram for explaining display of handwritten figures.

The online handwritten-figure acquiring unit 2 acquires the handwritten figures via the online (Step S201). More particularly, the online handwritten-figure acquiring unit 2 reads figures drawn by the user with the pointing device or figures on the touch-sensor screen drawn by the user with his finger or the dedicated pen. FIG. 3 is a schematic diagram for explaining display of the acquired handwritten figures on the display unit 7.

The user can specify a type of data to be inserted in a position indicated by one of the handwritten figures by manipulating the online handwritten-figure acquiring unit 2 (the command receiving unit 8). If the user specifies a type of data, the online handwritten-figure acquiring unit 2 additionally acquires information about the specified type of data at Step S201. For example, the user can change a type (color) of line depending on type of data (e.g., green lines could be used to represent text data, and blue lines could be used to represent image data), or separately specifies a type of data after inputting the handwritten figures. Acquisition of such information makes it possible to increase the speed and accuracy of the similar-model selecting process performed by the similar-model selecting unit 4.

Figure 4:
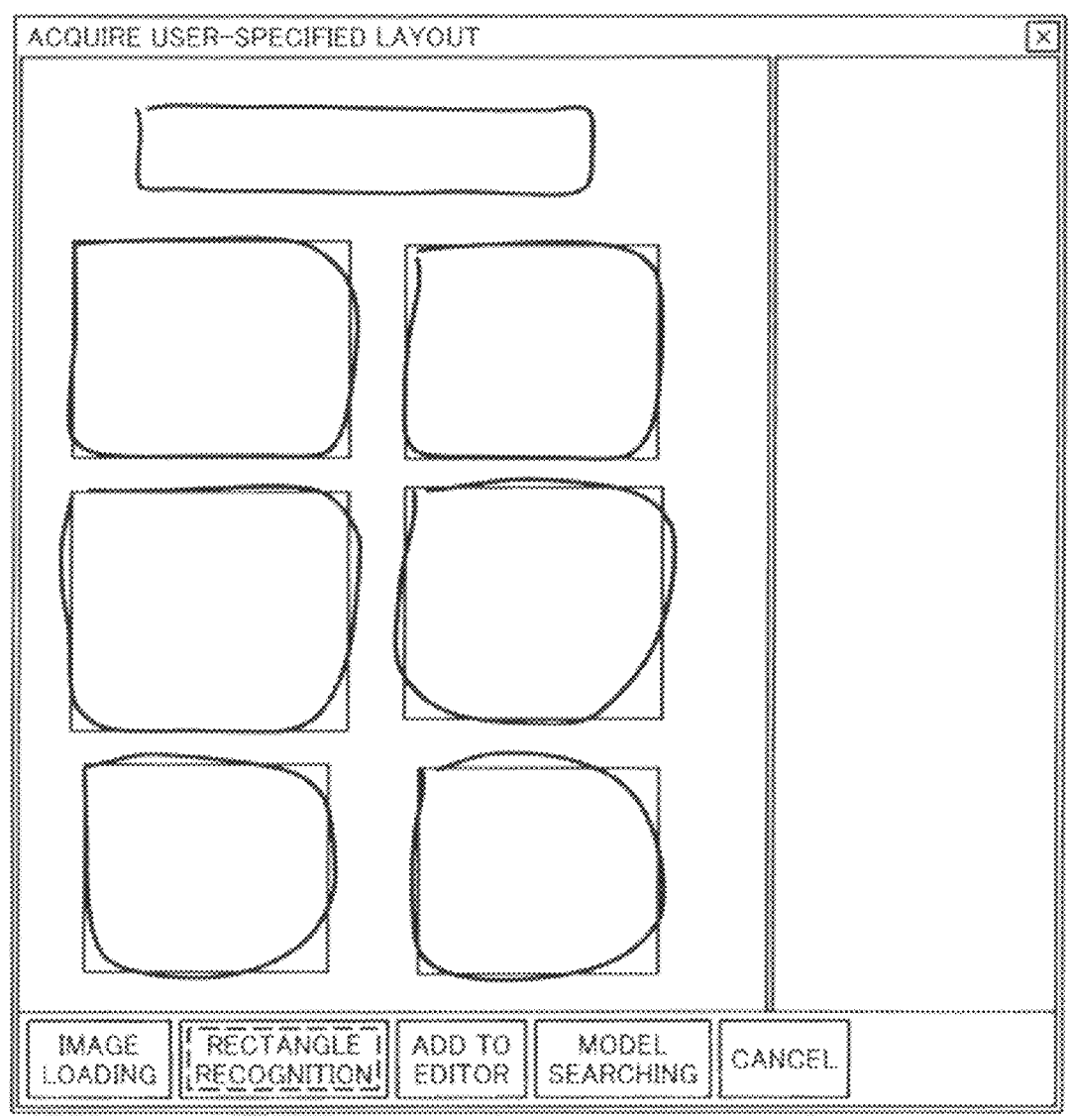
FIG. 4 is a schematic diagram for explaining display of handwritten figures and rectangles created from those handwritten figures.
Figure 5:
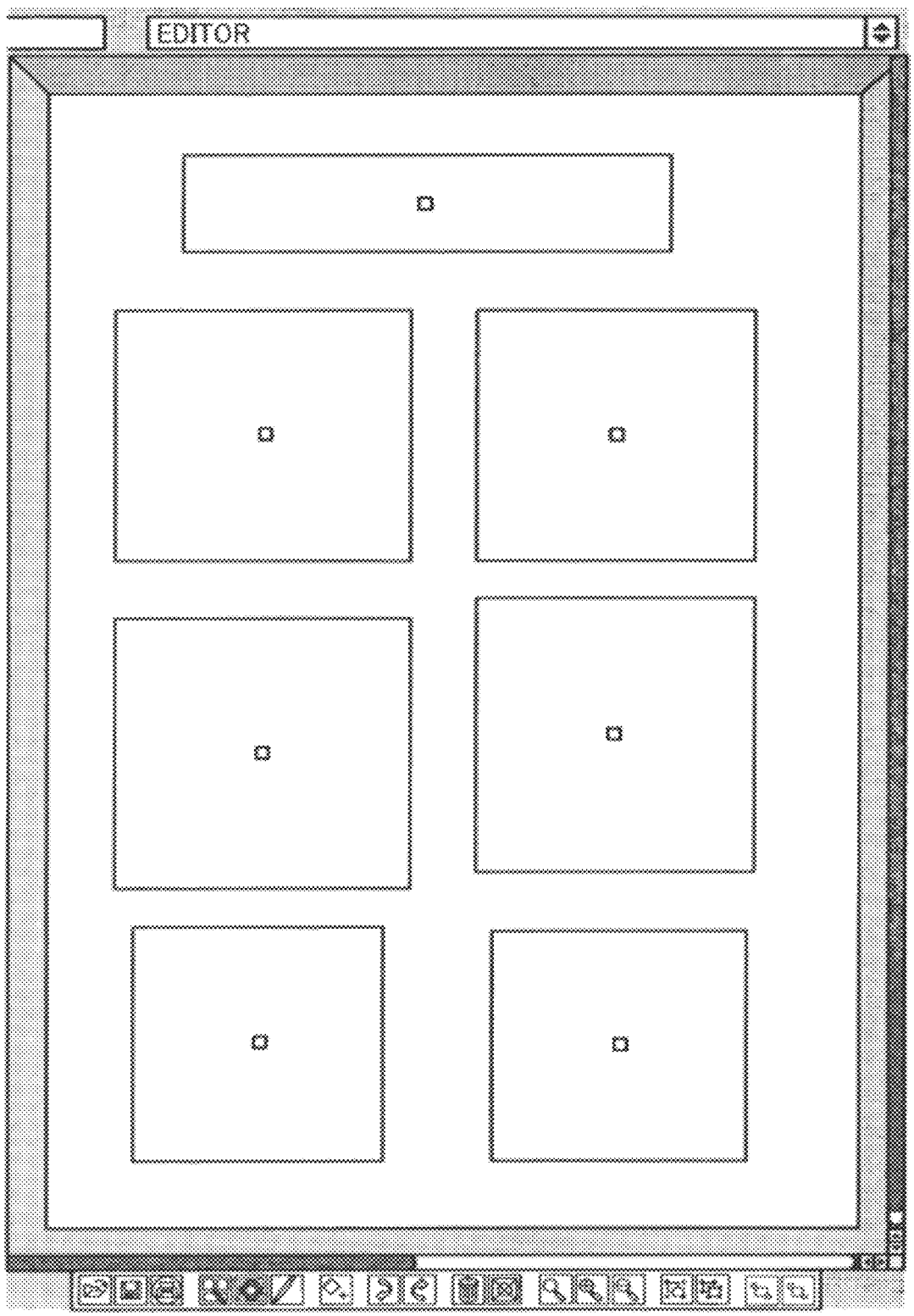
FIG. 5 is a schematic diagram for explaining display of a user-specified layout.

The online user-specified layout recognizing unit 3 recognizes the handwritten figures acquired by the online handwritten-figure acquiring unit 2, converts those handwritten figures into the most-matching rectangle (simple figures), and recognizes the user-specified layout including the rectangles (Step S202). The recognized user-specified layout is then displayed on the display unit 7. The online recognizing process will be described in detail later. FIG. 4 is a schematic diagram for explaining display of the recognized handwritten figures and the rectangles (simple figures) that are obtained from the handwritten figures. FIG. 5 is a schematic diagram for explaining display of the recognized user-specified layout.

Figure 6:
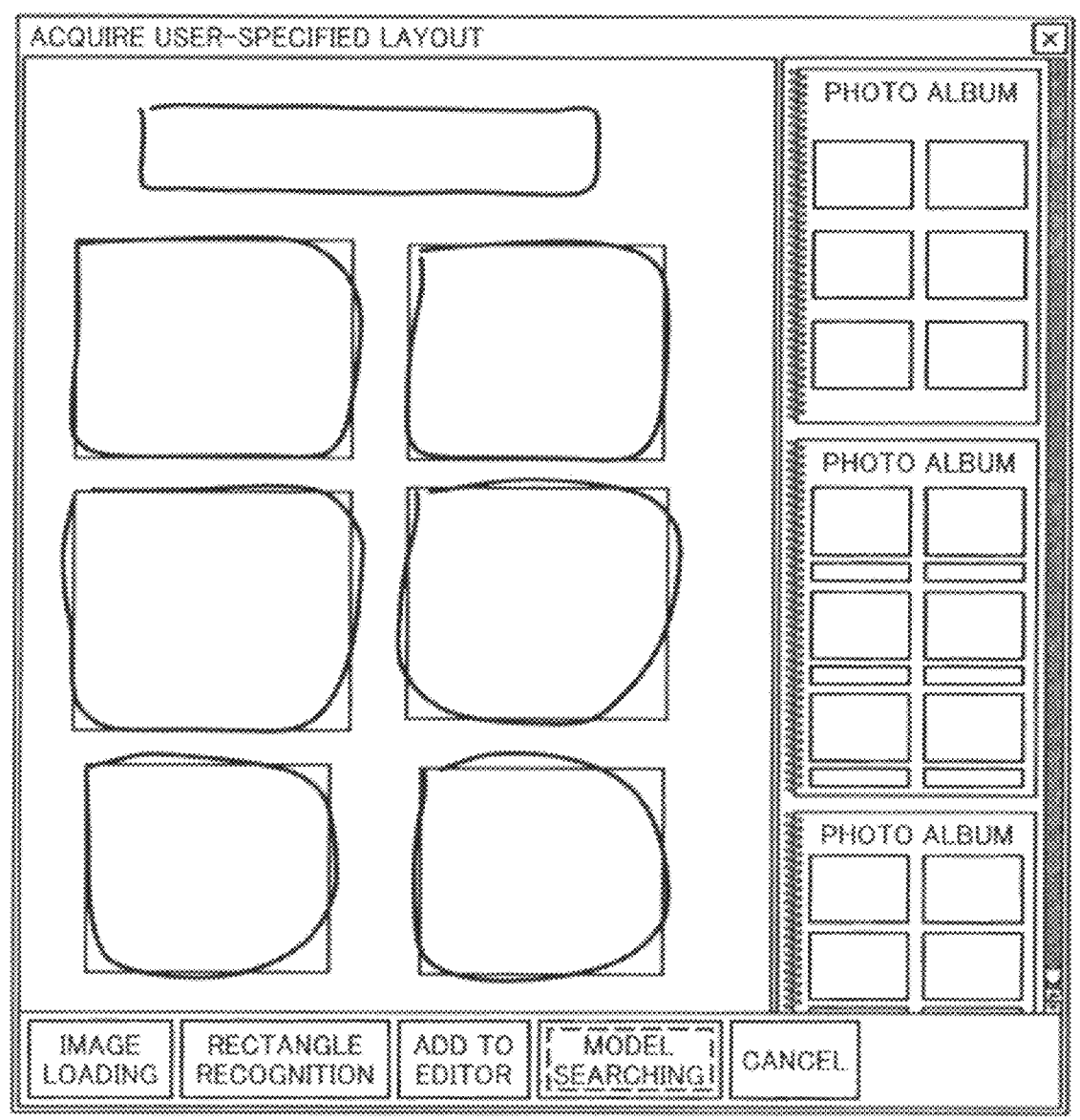
FIG. 6 is a schematic diagram for explaining display of layout models that are similar to the user-specified layout.

The similar-model selecting unit 4 selects layout models similar to the user-specified layout in a descending order of a similarity-level from the layout models stored in the layout-model storage unit 6 (Step S203). The display unit 7 then displays the predetermined number of selected layout models arranged in the similarity-level descending order. The similar-model selecting process will be described in detail later. FIG. 6 is a schematic diagram for explaining display of the layout models similar to the user-specified layout in the descending order of the similarity-level. The similar layout models are displayed on the right side on the display unit 7. The layout model with the highest similarity-level is arranged on the top, followed by the layout models with lower similarity-level in the descending order of the similarity-level.

Figure 7:
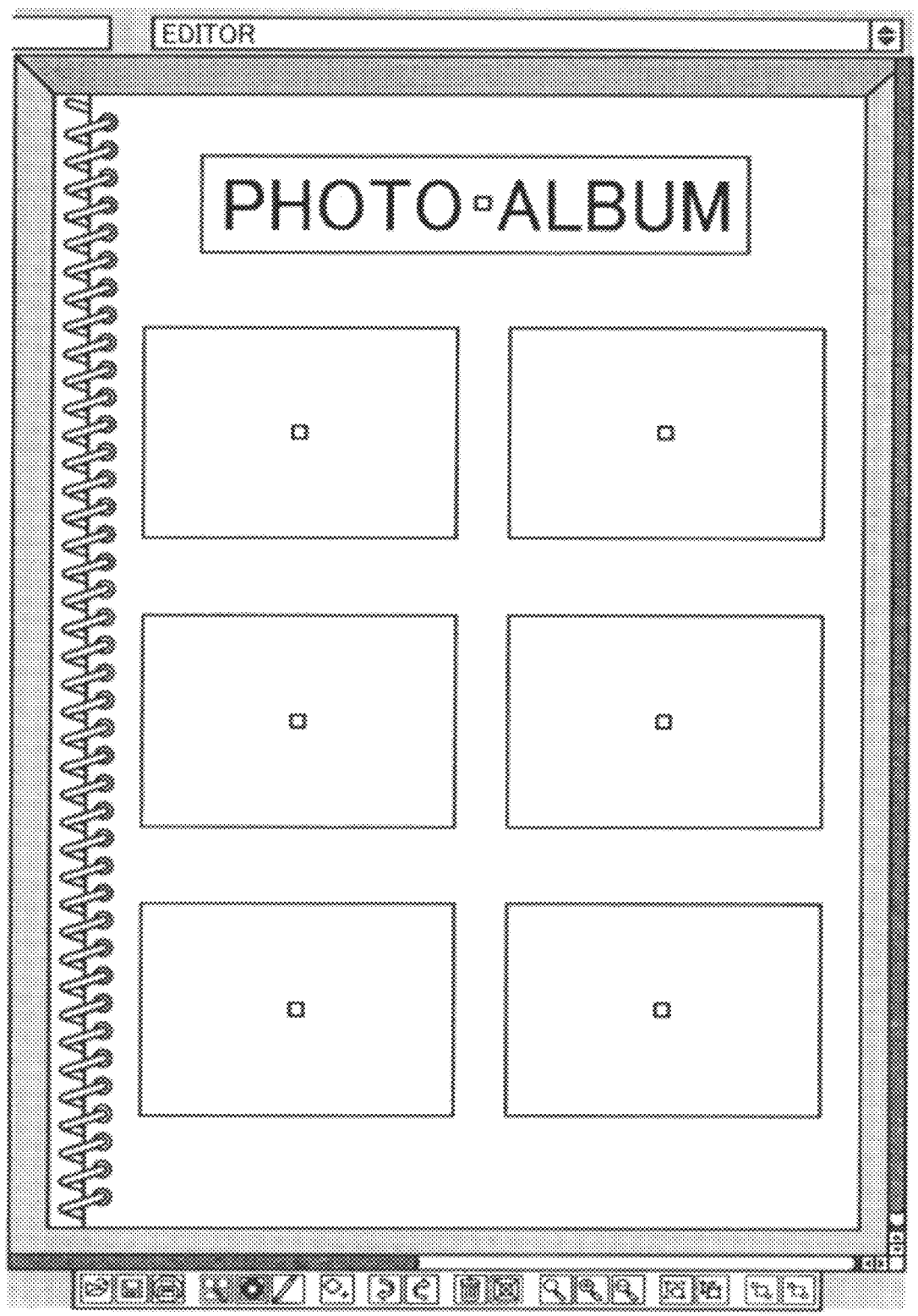
FIG. 7 is a schematic diagram for explaining display of selected layout model.

The user selects a desired layout model from among the layout models displayed on the display unit 7 by using the command receiving unit 8 (Step S204). FIG. 7 is a schematic diagram for explaining display of the desired layout model.

Figure 8:
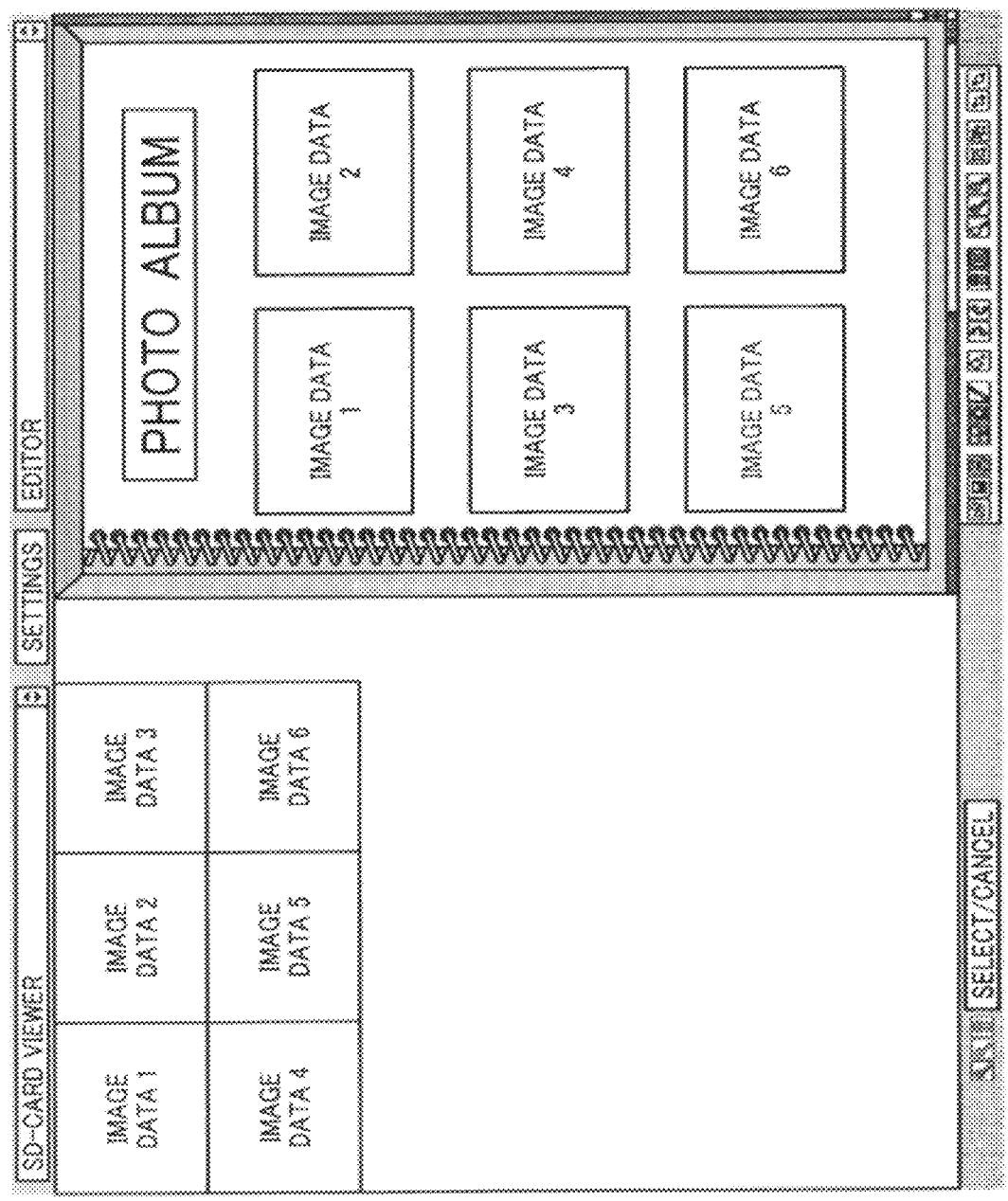
FIG. 8 is a schematic diagram for explaining display of pieces of data at desired positions.

The user selects a piece of data to be inserted into a target rectangular frame at a desired position in the desired layout model from among the pieces of data that are stored in the data storage unit 5 by using the command receiving unit 8. The selected piece of data is inserted into the target rectangular frame at the desired position (Step S205). FIG. 8 is a schematic diagram for explaining display of the pieces of data stored in the data storage unit 5 and the layout model in which the pieces of data are inserted at desired positions (within rectangular frames). The pieces of data are shown in the left side, and the layout model in which the pieces of data are positioned at desired positions (within rectangular frames) is shown in the right side. Thus, the document data is created.

Figure 9:
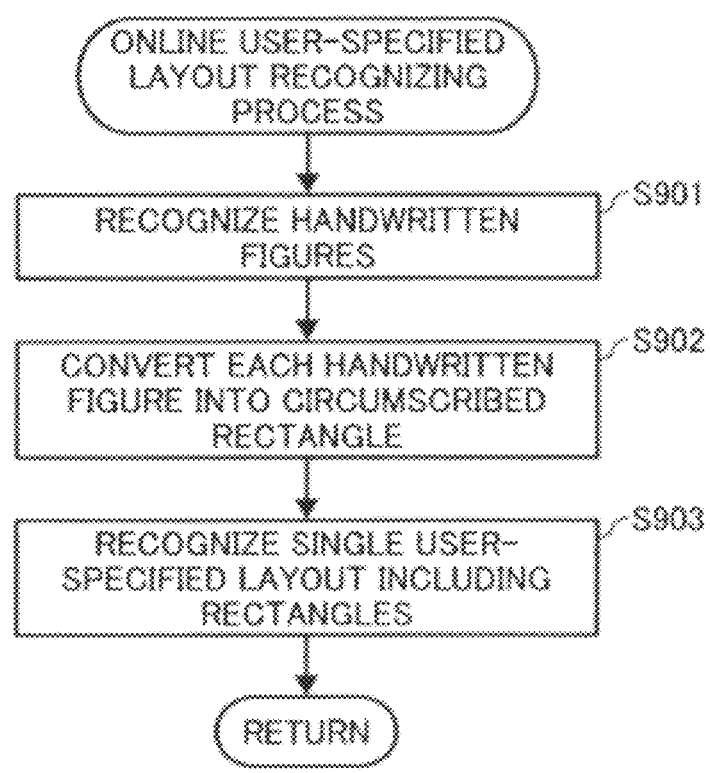
FIG. 9 is a flowchart of an online recognizing process according to the first embodiment.

The online user-specified layout recognizing process is described below. FIG. 9 is a flowchart of the online user-specified layout recognizing process according to the first embodiment. The goal of the online user-specified layout recognizing process is to recognize the user-specified layout from the handwritten figures that are directly received from the user.

The online user-specified layout recognizing unit 3 recognizes the handwritten figures acquired by the online handwritten-figure acquiring unit 2 (Step S901). In other words, in the online user-specified layout recognition, the handwritten figures are easily recognized just by directly reading the handwritten figures by using the online handwritten-figure acquiring unit 2.

After that, the online user-specified layout recognizing unit 3 converts each of the handwritten figures into a circumscribed rectangle (Step S902). As a result, the handwritten figures are converted into the rectangles.

The online user-specified layout recognizing unit 3 then recognizes the single user-specified layout including the rectangles (Step S903), and the online user-specified layout recognizing process goes to end.

Although the rectangles are obtained by converting the handwritten figures into the circumscribed rectangles at Step S902, it is allowable to obtain the rectangles by using another conversion approach. For example, the handwritten figures can be converted into inscribed rectangles, or the rectangles can be obtained by calculating a line located an average position of each side (i.e., each of left, right, top, and bottom sides) of the handwritten figure and connecting the four lines to each other.

Figure 10A:
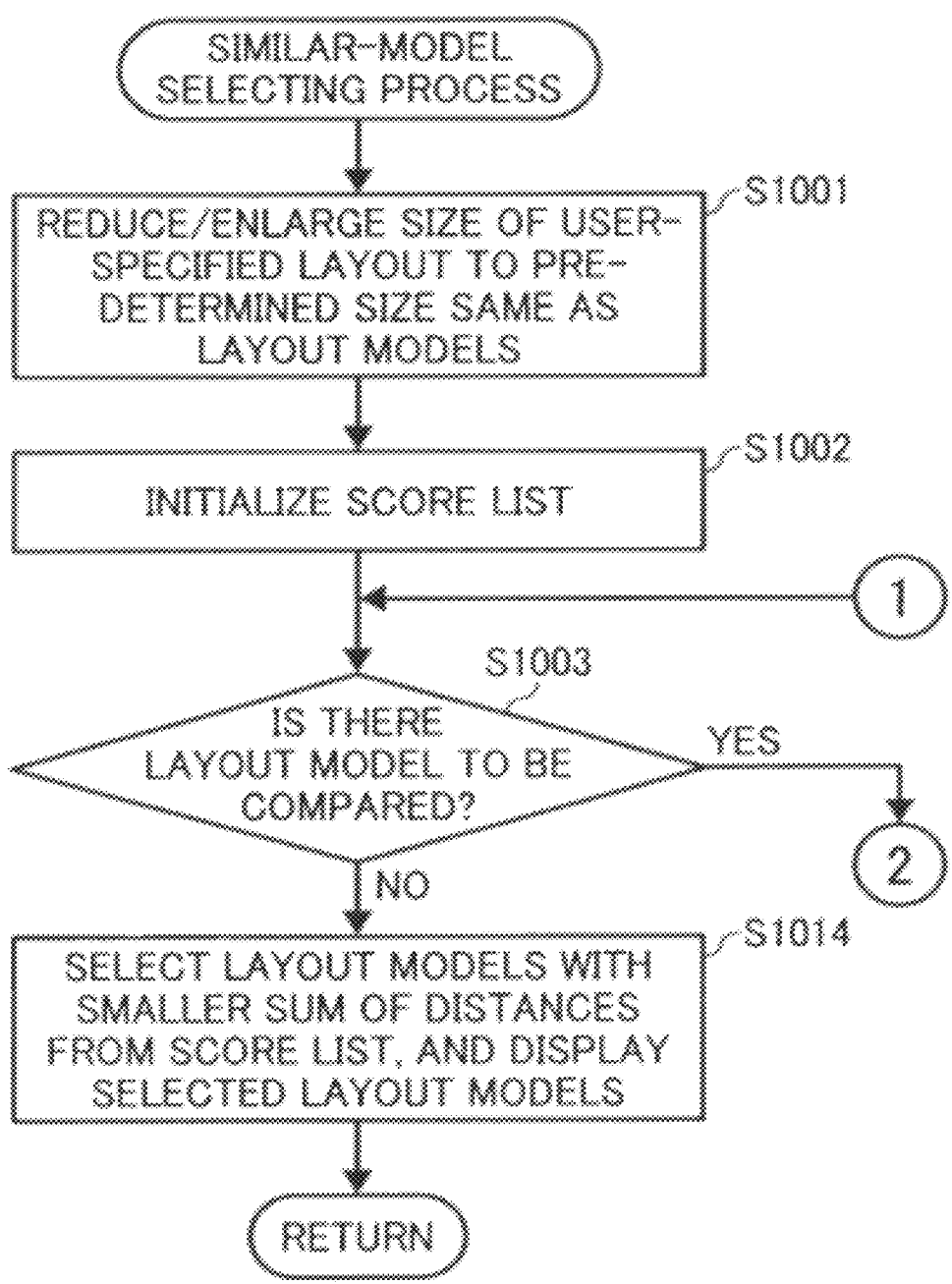
FIG. 10 is a flowchart of a similar-model selecting process according to the first embodiment.
Figure 10B:
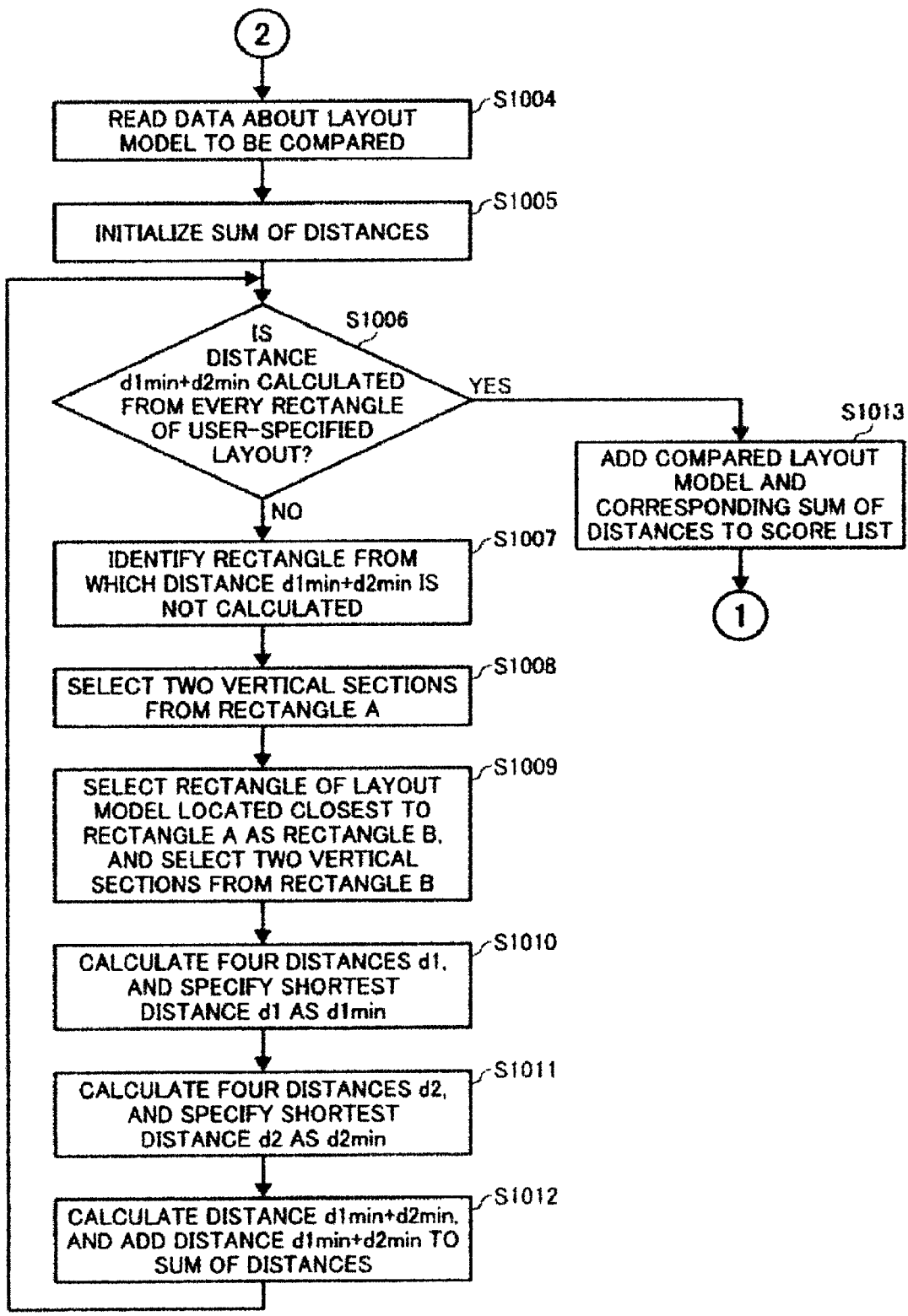
Figure 11:
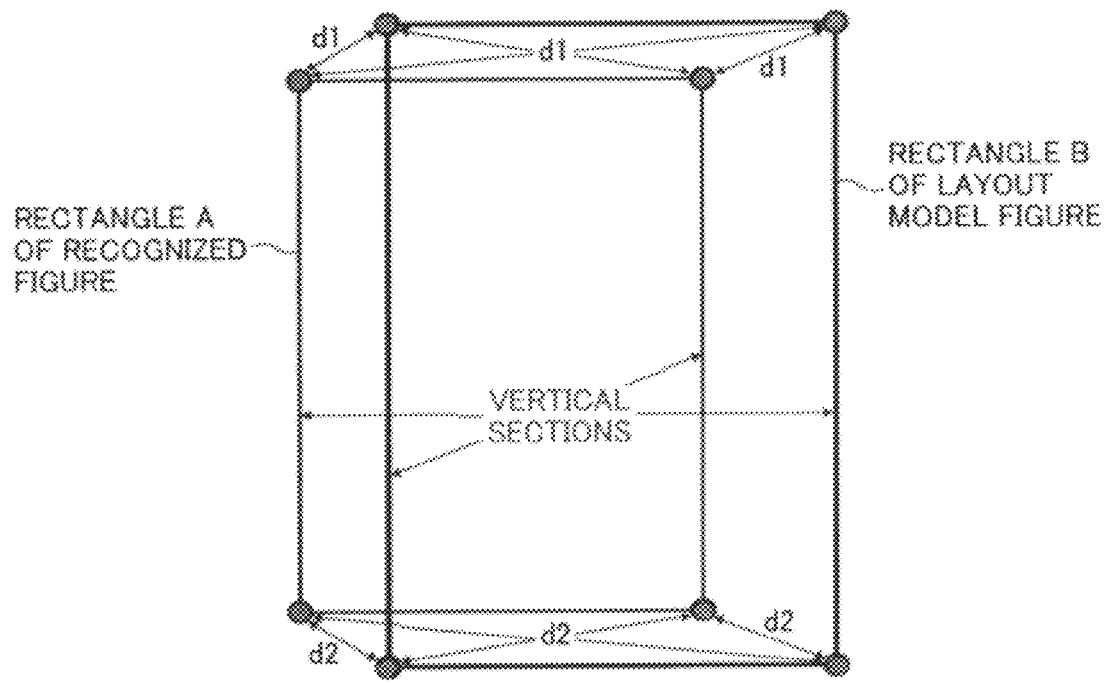
FIG. 11 is a schematic diagram for explaining the concept of the similar-model selecting process.

The similar-model selecting process is described below. FIG. 10 is a flowchart of the similar-model selecting process performed by the similar-model selecting unit 4. FIG. 11 is a schematic diagram for explaining the similar-model selecting process. The goal of the similar-model selecting process is to find out the layout model most similar to the user-specified layout.

The similar-model selecting unit 4 reduces/enlarges a size of the user-specified layout to a predetermined size same as the layout models (Step S1001). This is preparation for a subsequent step of comparing size of the rectangles of the user-specified layout with size of the rectangles in each layout model.

The similar-model selecting unit 4 initializes a score list stored in the data storage unit 5 (Step S1002). The score list shows a relation between the selected layout model and the sum of distances.

The similar-model selecting unit 4 determines whether there is a layout model to be compared with the user-specified layout (Step S1003). If there is a layout model to be compared with the user-specified layout (Yes at Step S1003), the similar-model selecting unit 4 reads data about the layout model to be compared (Step S1004).

The similar-model selecting unit 4 initializes the sum of distances stored in the data storage unit 5 (Step S1005). The sum of distances is obtained by adding all of distances d1min+d2min. An explanation about the distance d1min+d2min will be given later.

The similar-model selecting unit 4 determines whether the distance d1min+d2min is calculated from every rectangle of the user-specified layout (Step S1006). If the distance d1min+d2min is not calculated from every rectangle of the user-specified layout (No at Step S1006), the similar-model selecting unit 4 identifies a rectangle from which the distance d1min+d2min is not calculated (Step S1007).

Assuming that the similar-model selecting unit 4 tries to compare one of rectangles of the user-specified layout (hereinafter, "rectangle A") with one of rectangles of the layout model (hereinafter, "rectangle B"). The similar-model selecting unit 4 selects two vertical sections from the rectangle A, (hereinafter, "vertical line A1" and "vertical line A2") (Step S1008).

The similar-model selecting unit 4 selects a rectangle of the layout model located closest to the rectangle A as the rectangle B, and selects two vertical sections from the rectangle B (hereinafter, "vertical line B1" and "vertical line B2") (Step S1009).

The similar-model selecting unit 4 calculates distances between an upper end of the vertical line A1 and an upper end of the vertical line B1, the upper end of the vertical line A1 and an upper end of the vertical line B2, an upper end of the vertical line A2 and the upper end of the vertical line B1, and the upper end of the vertical line A2 and the upper end of the vertical line B2 as distances d1, and specifies the shortest distance d1 from among the four distances d1 as the d1min (Step S1010).

The similar-model selecting unit 4 calculates distances between an lower end of the vertical line A1 and an lower end of the vertical line B1, the lower end of the vertical line A1 and an lower end of the vertical line B2, an lower end of the vertical line A2 and the lower end of the vertical line B1, and the lower end of the vertical line A2 and the lower end of the vertical line B2 as distances d2, and specifies the shortest distance from among the four distances d2 as the d2min (Step S1011).

The similar-model selecting unit 4 calculates the distance d1min+d2min by adding the distance d1min and the distance d2min, and adds the calculated distance d1min+d2min to the sum of distances stored in the data storage unit 5 (Step S1012), and the process control returns to Step S1006.

If the distance d1min+d2min is calculated from every rectangle of the user-specified layout, i.e., the similar-model selecting unit 4 determines that the sum of distances is calculated (Yes at Step S1006), the similar-model selecting unit 4 adds the compared layout model and the corresponding sum of distances to the score list stored in the data storage unit 5 (Step S1013), and the process control returns to Step S1003.

If there is no layout model to be compared with the user-specified layout, i.e., all of layout models has been compared with the user-specified layout (No at Step S1003), the similar-model selecting unit 4 selects the predetermine number of layout models each having a smaller sum of distances, i.e., layout models with higher similarity-level from among the layout models in the score list, and displays the selected layout models on the display unit 7 in the similarity-level descending order (Step S1014), and the similar-model selecting process goes to end.

Before a start of the similar-model selecting process, the user can input a desired type of layout to the document-data creating apparatus 1 via the online handwritten-figure acquiring unit 2 or the command receiving unit 8. If information about the desired type of layout has been received, the similar-model selecting unit 4 selects layout models categorized in the desired type only. For example, if the user wishes a photo-album layout, the similar-model selecting unit 4 selects layout models categorized in the photo album without selecting layout models categorized in other types such as CV, invoice, and calendar. Acquisition of such information makes it possible to increase the speed and accuracy of the similar-model selecting process.

In this manner, the document-data creating apparatus according to the first embodiment converts the handwritten figures directly received from the user into the simple figures such as rectangles, and recognizes the user-specified layout including the simple figures. Thus, the user can easily create the presentable document data.

Moreover, the document-data creating apparatus calculates the distance between each rectangle of the user-specified layout and a corresponding rectangle of the layout model and adds all of the distances, thereby obtaining the sum of distances. The document-data creating apparatus then determines the layout model with the smallest sum of distances as the layout model most similar to the user-specified layout, and selects the most-similar layout model. Thus, the user can easily create the presentable document data.

The document-data creating apparatus 1 according to the first embodiment acquires the handwritten figures via the online. In contrast, a document-data creating apparatus 11 according to a second embodiment of the present invention acquires the handwritten figures via an offline.

Figure 12:
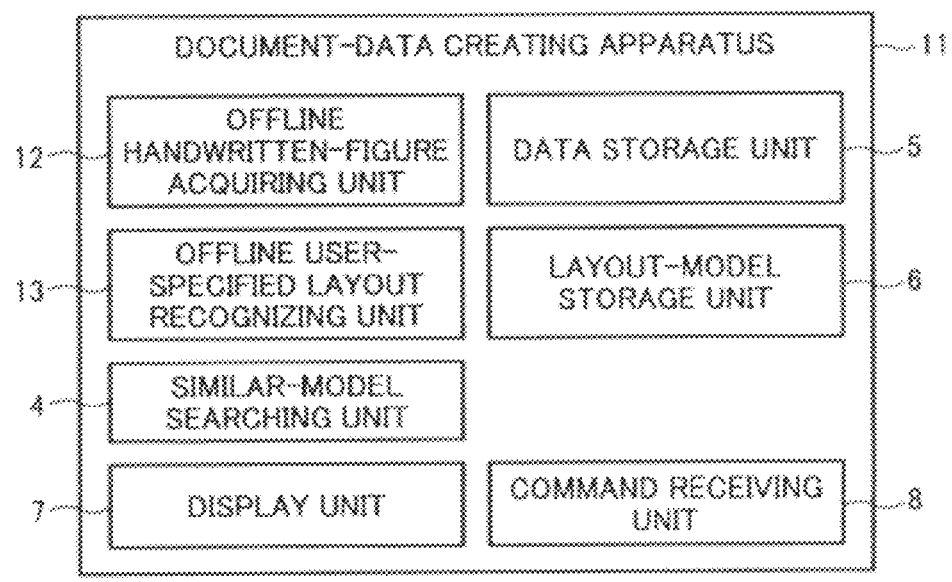
FIG. 12 is a block diagram of a document-data creating apparatus according to a second embodiment of the present invention.

Parts of the document-data creating apparatus 11 dissimilar to those in the first embodiment are described below. Other parts corresponding to those in the first embodiment are denoted with the same reference numerals, and the same description is not repeated. FIG. 12 is a block diagram of the document-data creating apparatus 11.

The document-data creating apparatus 11 includes an offline handwritten-figure acquiring unit 12, an offline user-specified layout recognizing unit 13, the similar-model selecting unit 4, the data storage unit 5, the layout-model storage unit 6, the display unit 7, and the command receiving unit 8.

The offline handwritten-figure acquiring unit 12 acquires (reads) the handwritten figures as image data via an offline. The offline handwritten-figure acquiring unit 12 can be, for example, an image reading device such as a scanner or an image capture device such as a digital camera.

The offline user-specified layout recognizing unit 13 recognizes the handwritten figures received from the user via the offline, and converts each of the handwritten figures into a most-matching simple figure such as a rectangle. An offline user-specified layout recognizing process of recognizing the user-specified layout from the handwritten figures received via the offline will be described in detail later.

Figure 13:
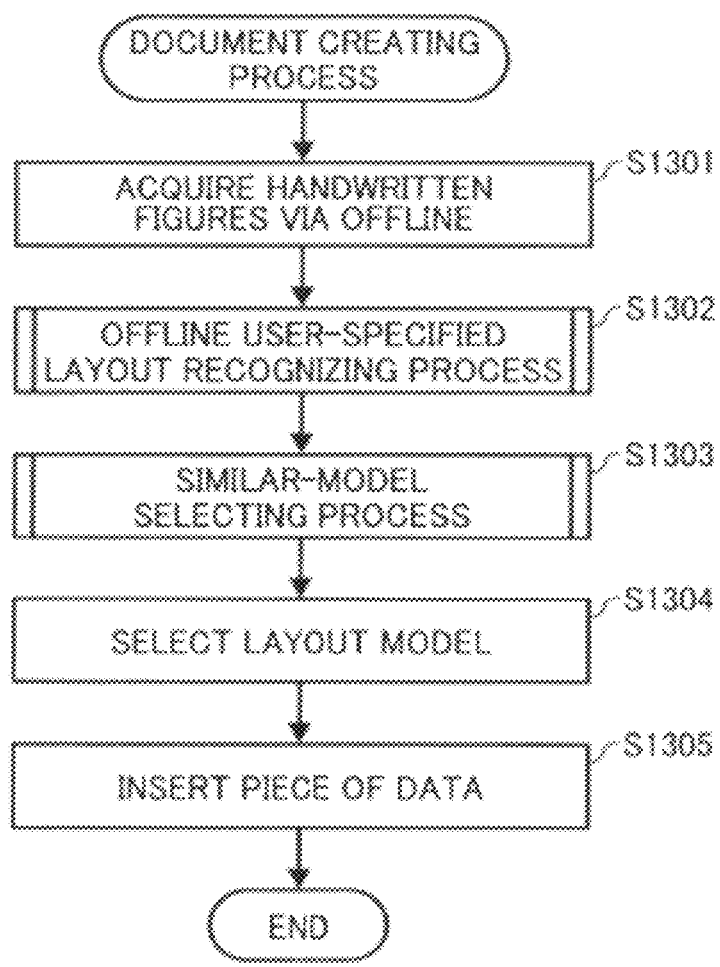
FIG. 13 is a flowchart of a document creating process according to the second embodiment.

A document creating process of creating the document data performed by the document-data creating apparatus 11 is described below. FIG. 13 is a flowchart of the document creating process according to the second embodiment.

The offline handwritten-figure acquiring unit 12 acquires the handwritten figures via the offline (Step S1301). More particularly, the offline handwritten-figure acquiring unit 12 reads the handwritten figures from a recording medium, such as paper, as image data.

The offline user-specified layout recognizing unit 13 recognizes the handwritten figures acquired by the offline handwritten-figure acquiring unit 12, converts each of the handwritten figures into the most-matching rectangle, and recognizes a layout including the rectangles as components as the user-specified layout (Step S1302). The recognized user-specified layout is then displayed on the display unit 7.

The similar-model selecting unit 4 selects layout models similar to the user-specified layout in the similarity-level descending order from among the layout models stored in the layout-model storage unit 6 (Step S1303). The display unit 7 then displays the selected layout models arranged in the similarity-level descending order. A similar-model selecting process according to the second embodiment is same as the above-described similar-model selecting process according to the first embodiment (see FIG. 10), and the same description is not repeated.

The user selects the desired layout model from among the layout models displayed on the display unit 7 by using the command receiving unit 8 (Step S1304).

The user selects a piece of data to be inserted into a target rectangular frame at a desired position in the selected layout model from among the pieces of data that are stored in the data storage unit 5 by using the command receiving unit 8. The selected piece of data is inserted into the target rectangular frame at the desired position (Step S1305). Thus, the document data is created.

Figure 14B:
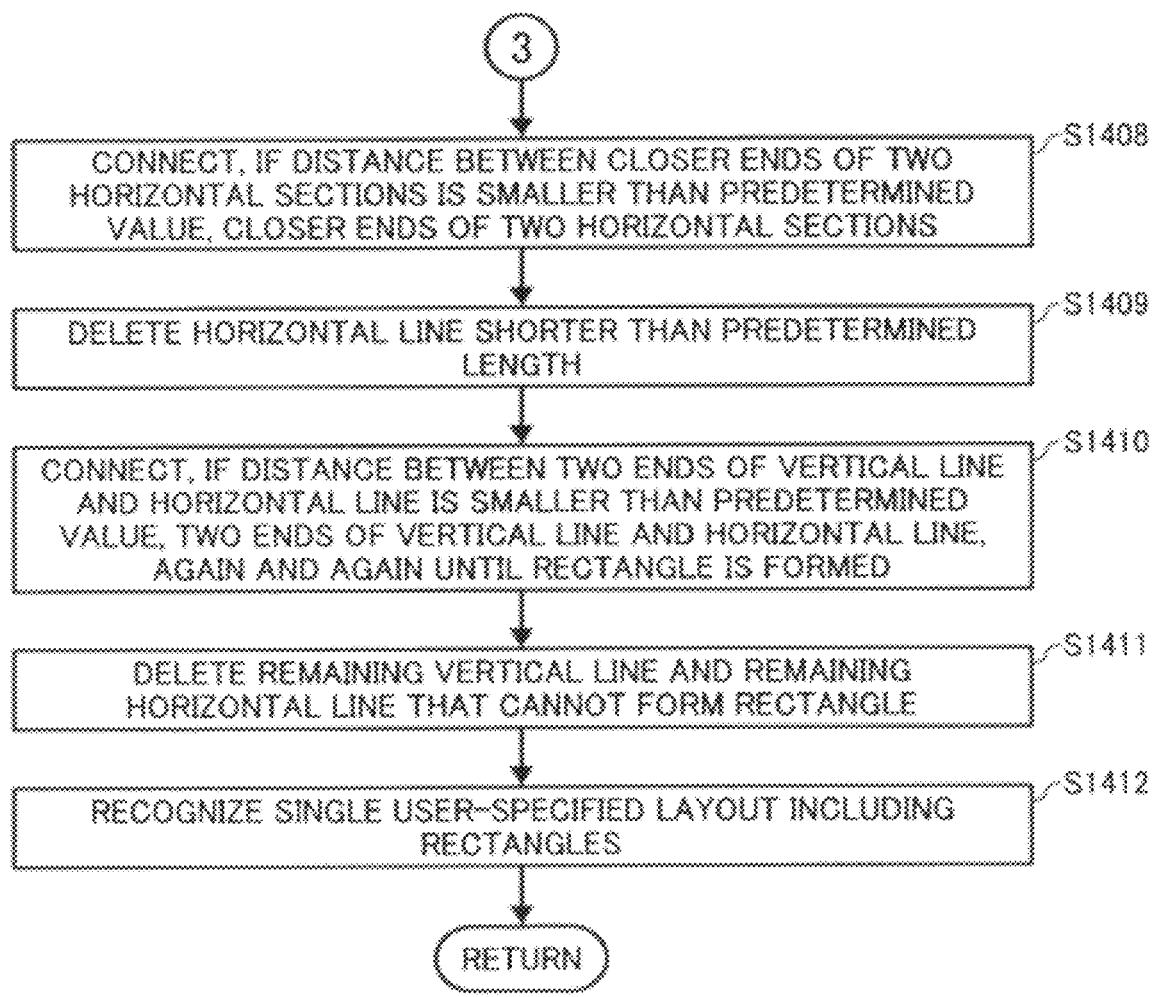
FIG. 14 is a flowchart of an offline user-specified layout recognizing process according to the second embodiment.

The offline user-specified layout recognizing process is described below. FIG. 14 is a flowchart of the offline user-specified layout recognizing process according to the second embodiment. The goal of the offline user-specified layout recognizing process is to recognize the user-specified layout from the handwritten figures obtained by reading image data from the recording medium such as a paper.

The offline user-specified layout recognizing unit 13 converts the obtained image data representing the handwritten figures into binary image data, thereby recognizing the handwritten figures as binary data (Step S1401). More particularly, the offline user-specified layout recognizing unit 13 divides the image data into pixels, and binarizes each pixel depending on black or white. Because it is necessary to recognize shapes and, especially, positions of the handwritten figures from the obtained image data, the offline user-specified layout recognizing process becomes more complicated than the online user-specified layout recognizing process.

The offline user-specified layout recognizing unit 13 specifies a series of vertically-adjacent black pixels in the binary data as a vertical section (Step S1402), and extracts a series of vertically-adjacent black pixels from a curve as a vertical section (Step S1403).

Figure 15:
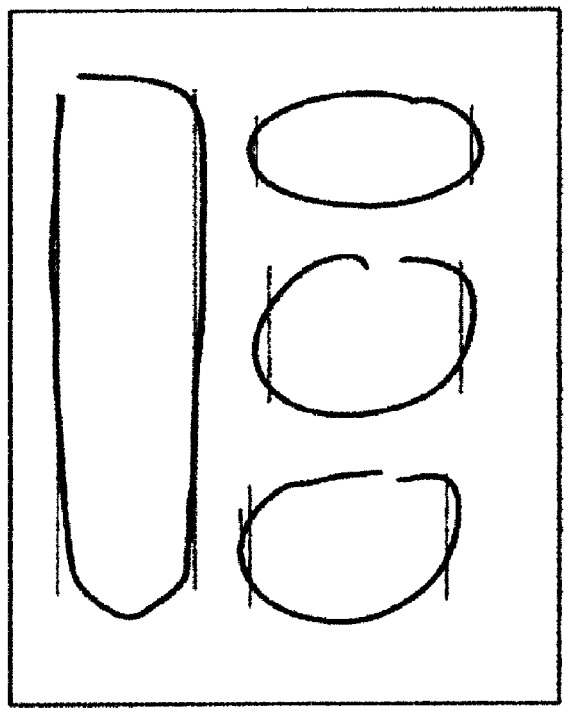
FIG. 15 is a schematic diagram for explaining vertical lines obtained in the offline user-specified layout recognizing process shown in FIG. 14.

The offline user-specified layout recognizing unit 13 connects, if a distance between closer ends of two vertical sections is smaller than a predetermined value, the closer ends of the two vertical sections (Step S1404), thereby obtaining a vertical line. The two vertical sections to be connected thereto are assumed to be arranged in the same horizontal position. FIG. 15 is a schematic diagram illustrating the vertical lines obtained at Step S1404.

After that, the offline user-specified layout recognizing unit 13 deletes a vertical line shorter than a predetermined length (Step S1405).

The offline user-specified layout recognizing unit 13 specifies a series of horizontally-adjacent black pixels in the binary data as a horizontal section (Step S1406), and extracts a series of horizontally-adjacent black pixels from a curve as a horizontal section (Step S1407).

Figure 16:
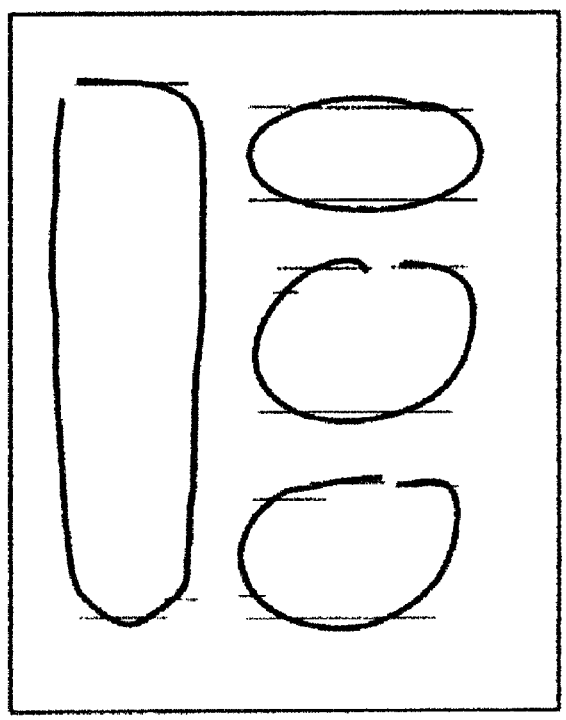
FIG. 16 is a schematic diagram for explaining horizontal lines obtained in the offline user-specified layout recognizing process shown in FIG. 14.

The offline user-specified layout recognizing unit 13 connects, if a distance between closer ends of two horizontal sections is smaller than a predetermined value, the closer ends of the two horizontal sections (Step S1408), thereby obtaining a horizontal line. The two horizontal sections to be connected thereto are assumed to be arranged in the same vertical position. FIG. 16 is a schematic diagram illustrating the horizontal lines obtained at Step S1408.

After that, the offline user-specified layout recognizing unit 13 deletes a horizontal line shorter than a predetermined length (Step S1409).

In this manner, the vertical lines are extracted from the binary data from Steps S1402 to S1405, and the horizontal lines are extracted from the binary data from Steps S1406 to S1409. Alternatively, it is allowable to extract the vertical lines after the horizontal lines, or to extract the vertical lines and the horizontal lines in a parallel manner.

The offline user-specified layout recognizing unit 13 connects, if a distance between two ends of a vertical line and a horizontal line is smaller than a predetermined value, the two ends of the vertical line and the horizontal line, again and again until a rectangle is formed (Step S1410).

The offline user-specified layout recognizing unit 13 then deletes a remaining vertical line and a remaining horizontal line that cannot form the rectangle (Step S1411). Thus, the handwritten figures are converted into the rectangles.

Figure 17:
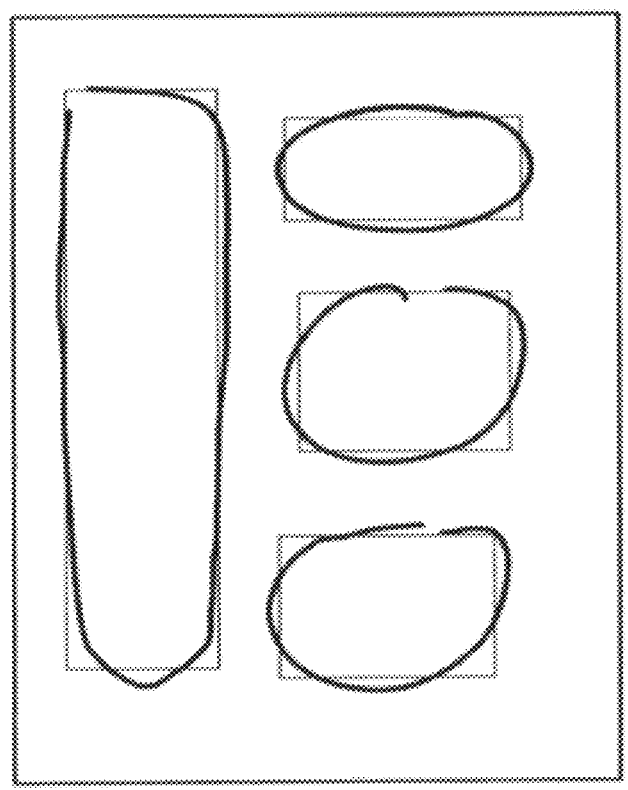
FIG. 17 is a schematic diagram for explaining display of the handwritten figures and the user-specified layout recognized from the handwritten figures.

The offline user-specified layout recognizing unit 13 then recognizes the single user-specified layout including the rectangles (Step S1412), and the offline user-specified layout recognizing process goes to end. FIG. 17 is a schematic diagram of the display unit 7 on which the recognized handwritten figures and the user-specified layout recognized from the handwritten figures. The offline user-specified layout recognizing unit 13 can easily convert any type of handwritten figures including curved or opened handwritten figures into rectangles in the offline user-specified layout recognizing process. This is because the offline user-specified layout recognizing unit 13 converts the handwritten figure into the rectangle by extracting the vertical lines and the horizontal lines and connecting the extracted lines.

In this manner, the document-data creating apparatus according to the second embodiment reads the handwritten figures from the recording medium such as paper, converts each of the handwritten figures into the most-matching simple figure such as a rectangle, and thereby recognizes the single user-specified layout including the simple figures. Thus, the user can easily create the presentable document data.

In the document-data creating apparatus according to either the first embodiment or the second embodiment, the similar-model selecting unit selects the layout models similar to the user-specified layout in the similarity-level descending order from among the layout models stored in the layout-model storage unit. The user selects the desired layout model from the selected similar layout models. Alternatively, the similar-model selecting unit can be configured to select only the layout model most similar to the user-specified layout.

Figure 18:
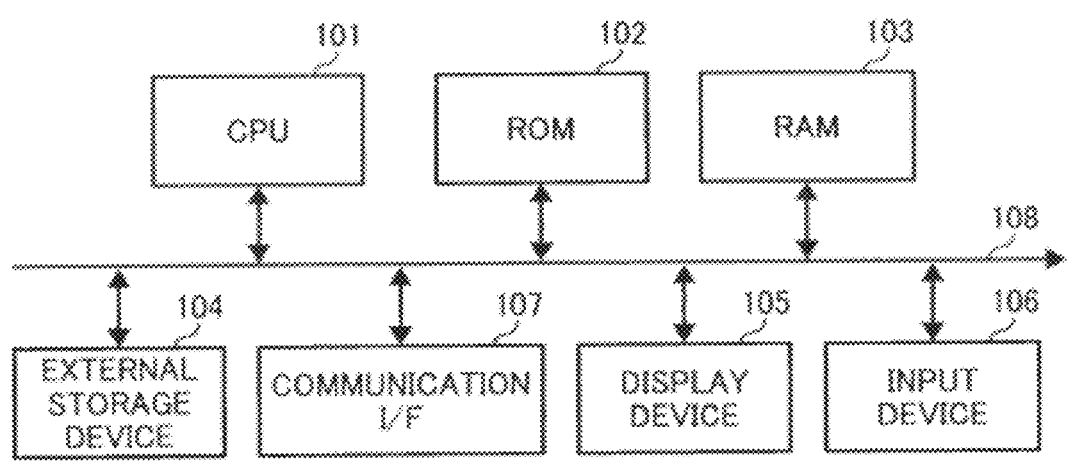
FIG. 18 is a block diagram of the hardware structure of the document-data creating apparatus according to the first embodiment or the second embodiment.

FIG. 18 is a block diagram of the hardware structure of the document-data creating apparatus 1 or 11. Each of the document-data creating apparatuses 1 and 11 includes a central processing unit (CPU) 101 as a control device, a read only memory (ROM) 102 and a random access memory (RAM) 103 as storage devices, an external storage device 104 such as a hard disk drive (HDD), a compact disk (CD), and a drive device, a display device 105 such as a monitor, an input device 106 such as a keyboard and a mouse, a communications interface (I/F) 107, and a bus 108 that connects those units to each other as the hardware structure. The document-data creating apparatuses 1 and 11 can be implemented with a typical computer.

A document creating program executed by the document-data creating apparatus 1 or 11 can be stored, in a form of a file that is installable and executable on a computer, in a recording medium readable by the computer, such as a compact disk-read only memory (CD-ROM), a flexible disk (FD), a compact disk-recordable (CD-R), and a digital versatile disk (DVD).

On the other hand, the document creating program can be stored in another computer connected to the computer via a network such as the Internet, and downloaded to the computer via the network. The document creating program can be delivered or distributed via a network such as the Internet. Alternatively, the document creating program can be delivered or distributed, for example, in a state preinstalled into a recording medium such as a ROM.

The document creating program is, for example, made up of modules that implement the units of the document-data creating apparatus 1 or 11, such as the online user-specified layout recognizing unit 3, the similar-model selecting unit 4, the offline user-specified layout recognizing unit 13, and etc., as software. When the CPU 101 (processor) reads the document creating program from the recording medium and executes the read document creating program, the above modules are loaded and created on a main memory thereby implementing the online user-specified layout recognizing unit 3, the similar-model selecting unit 4, the offline user-specified layout recognizing unit 13, and etc.

According to an aspect of the present invention, a document-data creating apparatus receives handwritten figures from a user, recognizes a layout including the handwritten figures as components as a user-specified layout, and selects a layout model similar to the user-specified layout. Thus, the user can easily create presentable document data.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for creating document data, the apparatus comprising:
    an acquiring unit that acquires a handwritten figure;
    a recognizing unit that converts the handwritten figure acquired by the acquiring unit into a specific figure, and recognizes, as a user-specified layout, a layout including the specific figure as a component;
    a storage unit including a memory that stores therein data to be inserted into a desired one of a plurality of layout models;
    a selecting unit that selects a layout model similar to the user-specified layout from among the layout models as a similar layout model; and
    an inserting unit that inserts the data stored in the storage unit into the similar layout model selected by the selecting unit.

2. The apparatus according to claim 1, wherein the recognizing unit converts the handwritten figure into a rectangle of a size that matches the handwritten figure, and the recognizing unit recognizes as the user-specified layout a layout including the rectangle as a component.

3. The apparatus according to claim 2, wherein
    the acquiring unit acquires the handwritten figure by receiving a handwritten figure from a user, and
    the recognizing unit recognizes the user-specified layout from the handwritten figure acquired by the acquiring unit.

4. The apparatus according to claim 2, wherein
    the acquiring unit acquires a user-specified type of the data to be inserted into a desired one of the layout models, and
    the selecting unit selects a layout model, similar to the user-specified layout model, from among layout models capable of receiving data, with the user-specified type as the similar layout model.

5. The apparatus according to claim 2, wherein the acquiring unit acquires the handwritten figure via any one of a pointing device and a touch-sensor screen.

6. The apparatus according to claim 2, wherein
    the acquiring unit acquires the handwritten figure as image data from a recording medium on which the handwritten figure is formed, and
    the recognizing unit recognizes the user-specified layout from the image data acquired by the acquiring unit.

7. The apparatus according to claim 2, wherein the selecting unit selects a layout model, similar to the user-specified layout from among layout models that are categorized into a user-specified type of layout model, as the similar layout model.

8. A method of creating document data performed by a document-data creating apparatus that includes a storage unit including therein data to be inserted into a desired one of a plurality of layout models, the method comprising:
acquiring a handwritten figure;
recognizing including converting the handwritten figure acquired at the acquiring into a specific figure, and recognizing, as a user-specified layout, a layout including the specific figure as a component;
selecting a layout model similar to the user-specified layout from among the layout models as a similar layout model; and
inserting the data stored in the storage unit into the similar layout model selected at the selecting.

9. The method according to claim 8, wherein the recognizing includes converting the handwritten figure into a rectangle of a size that matches with the handwritten figure, and recognizing, as the user-specified layout, a layout including the rectangle as a component.

10. The method according to claim 9, wherein
the acquiring includes acquiring the handwritten figure by receiving a handwritten figure from a user, and
the recognizing includes recognizing the user-specified layout from the handwritten figure acquired at the acquiring.

11. The method according to claim 9, wherein
the acquiring includes acquiring a user-specified type of the data to be inserted into a desired one of the layout models, and
the selecting includes selecting a layout model, similar to the user-specified layout model, from among layout models capable of receiving data with the user-specified type as the similar layout model.

12. The method according to claim 9, wherein the acquiring includes acquiring the handwritten figure via any one of a pointing device and a touch-sensor screen.

13. The method according to claim 9, wherein
the acquiring includes acquiring the handwritten figure as image data from a recording medium on which the handwritten figure is formed, and
the recognizing includes recognizing the user-specified layout from the image data acquired at the acquiring.

14. The method according to claim 9, wherein the selecting includes selecting a layout model, similar to the user-specified layout, from among layout models that are categorized into a user-specified type of layout model, as the similar layout model.

15. A non-transitory computer-readable storage medium storing computer-readable instructions thereon, which, when executed by a computer, cause the computer to perform a method of creating document data on a document-data creating apparatus that includes a storage unit including therein data to be inserted into a desired one of a plurality of layout models, the method comprising:
acquiring a handwritten figure;
recognizing including converting the handwritten figure acquired at the acquiring into a specific figure, and recognizing, as a user-specified layout, a layout including the specific figure as a component;
selecting a layout model similar to the user-specified layout from among the layout models as a similar layout model; and
inserting the data stored in the storage unit into the similar layout model selected at the selecting.

16. The non-transitory computer-readable storage medium according to claim 15, wherein the recognizing includes converting the handwritten figure into a rectangle of a size that matches with the handwritten figure, and recognizing, as the user-specified layout, a layout including the rectangle as a component.

17. The non-transitory computer-readable storage medium according to claim 16, wherein the acquiring includes acquiring the handwritten figure by receiving a handwritten figure from a user, and the recognizing includes recognizing the user-specified layout from the handwritten figure acquired at the acquiring.

18. The non-transitory computer-readable storage medium according to claim 16, wherein the acquiring includes acquiring a user-specified type of the data to be inserted into a desired one of the layout models, and the selecting includes selecting a layout model, similar to the user-specified layout model, from among layout models capable of receiving data, with the user-specified type as the similar layout model.

19. The non-transitory computer-readable storage medium according to claim 16, wherein the selecting includes selecting a layout model, similar to the user-specified layout, from among layout models that are categorized into a user-specified type of layout model, as the similar layout model.

* * * * *